United States Patent Office 2,981,772
Patented Apr. 25, 1961

2,981,772
ALKYLATION PROCESS
George Holzman, Walnut Creek, and John J. Madison, Orinda, Calif., assignors to Shell Oil Company, a corporation of Delaware
No Drawing. Filed Aug. 28, 1959, Ser. No. 836,628
3 Claims. (Cl. 260—683.63)

This invention relates to a process for the preparation of high-octane gasoline components by alkylating isoparaffins with olefins in the presence of concentrated sulfuric acid as catalyst.

It is well known to prepare high-octane gasoline components by alkylating isoparaffins with olefins in the presence of concentrated sulfuric acid at low temperatures of about 0° C. to 30° C. Concentrated sulfuric acid is known to be one of the most practical and effective catalysts for this reaction and to give desired good yields when it is maintained relatively pure. The process has been used extensively in commercial practice for over the past twenty years.

The main reaction which takes place under the influence of sulfuric acid is alkylation. Thus, for instance, isobutane and butylene react to form isooctane. The alkylation mechanism is complicated and is accompanied by side reactions such as isomerization, polymerization, cracking and the like. These side reactions are undesirable in that they reduce yield and quality of the alkylate product and often tend to foul the catalyst. Therefore, ways of controlling the reaction are of practical importance.

In order to suppress undesirable side reactions (such as polymerization), the usual practice is to provide a substantial excess of isoparaffin in the reaction mixture. Of course this improves the chance that the olefin will come into intimate contact with the isoparaffin for the alkylation reaction rather than come into contact with more olefin for a polymerization reaction. Thus, although a substantial portion of the isoparaffin which enters the alkylation zone is unconverted, practically all the olefin introduced into the alkylation zone reacts with isoparaffin. Unreacted isoparaffin is recovered from the alkylation zone effluent and recycled to maintain the desired concentration thereof in the alkylation zone.

In accordance with the present invention, it has now been found that an addition of a halogen-substituted acetic acid to the sulfuric acid catalyst improves the alkylation in several respects. The substituted acetic acid is an effective promoter for the alkylation reaction as it materially increases the proportion of $C_8$ hydrocarbons in the light alkylate and improves selectivity towards higher branched isomers, i.e., increases the proportion of trimethyl over dimethyl substituted alkanes, thus improving octane quality of the light alkylate.

In general, the strength of acetic acid is increased by substituting a halogen for the alkyl hydrogen atoms. The more highly substituted with halogen, the greater the strength. This is indicated by the ionization constants given in the following table:

TABLE I

| | $K_a$ |
|---|---|
| Acetic acid | $1.86 \times 10^{-5}$ |
| Iodoacetic acid | $7.1 \times 10^{-4}$ |
| Bromoacetic acid | $1.38 \times 10^{-3}$ |
| Chloroacetic acid | $1.55 \times 10^{-3}$ |
| Dichloroacetic acid | $5 \times 10^{-2}$ |
| Trichloroacetic acid | $2 \times 10^{-1}$ |
| Trifluoroacetic acid | 1.8 |

Thus, trichloroacetic acid and trifluoroacetic acid, wherein all of the alkyl hydrogen atoms have been substituted with halogen atoms, are strong acids, roughly equivalent to hydrochloric acid.

The halogen-substituted acetic acid used in the present process should be strongly acidic. This is desirable to avoid diluting the sulfuric acid catalyst excessively, since with diminution of the acid strength, yields tend to be adversely affected. Suitably strong acids are those wherein the alkyl hydrogens of the acetic acid have been completely substituted with the more active halogens, i.e., halogens having an atomic weight less than 36, such as fluorine and chlorine. Trifluoroacetic acid is particularly suitable in the present process.

The beneficial effect of the halogen-substituted acetic acid is obtained over a wide range of concentrations. However, from an economic point of view, it is preferred that the concentration of halogen-substituted acetic acid in the total acid mixture be not more than about 50% by weight, more especially no more than about 25% by weight. Particularly preferred concentrations are those below about 20% by weight. On the other hand, to obtain the benefits of the invention to a substantial degree, it is generally desirable to use at least 2% by weight of the substituted acetic acid, based on the total acid mixture, and more especially at least about 5% by weight. A particularly preferred concentration range is from about 7.5% to about 15% by weight in the total acid mixture.

The alkylation reaction may be carried out in any suitable form of apparatus and with a variety of isoparaffins and olefins, such as are capable of entering into the low-temperature alkylation reaction with concentrated sulfuric acid, e.g., isobutane with butylenes, propylene, amylenes, or polymers of butylene or propylene. As in the usual procedure, the molal ratio of isoparaffin to olefin is at least 1:1, and preferably higher, and the titratable acidity of the catalyst is maintained in the reaction mixture above 85%, and preferably from about 90% to 98%. The pressure is suitably maintained to carry out the reaction in the liquid phase.

The invention will be further illustrated by means of the following examples.

*Example I*

For a blank run, isobutane was alkylated with isobutylene at 0° C. in the presence of 96% $H_2SO_4$ at a liquid hourly space velocity of 0.17. The isobutane concentration in the hydrocarbon phase was approximately 40% by weight. The reaction mixture was mechanically stirred with a stirrer speed of 4000 r.p.m. The same reaction was run in a comparative manner using a catalyst comprising 10% by weight of 100% trifluoroacetic acid and 90% by weight of 97% sulfuric acid. The strength of the acid mixture was roughly equivalent to that of 96% $H_2SO_4$.

The results shown in Table II clearly show the improved yield of $C_8$ hydrocarbons in the light alkylate and the reduction in dimethyl-substituted isomers (and therefore the increase in trimethyl-substituted isomers).

TABLE II

| Component | Yield, percent weight | |
|---|---|---|
| | 96.0% $H_2SO_4$ | 10% $CF_3CO_2H$– 90% $H_2SO_4$ |
| $C_5$ | 12.1 | 11.7 |
| $C_6$ | 11.1 | 9.7 |
| 2,4-Dimethylpentane | 6.4⎫ 10.3 | 5.8⎫ 8.4 |
| Other $C_7$ | 3.9⎭ | 2.6⎭ |
| Dimethylhexane | 10.7⎫ 52.4 | 9.9⎫ 53.7 |
| Trimethylpentanes | 41.7⎭ | 43.8⎭ |
| $C_9$ | 14.1 | 16.5 |
| | 100.0 | 100.0 |

*Example II*

A similar experiment was run using the same conditions and reactants as described in Example I. However, the acid mixture comprised 330 grams of 100% trifluoroacetic acid and 97.4 grams of 100% sulfuric acid. Again the acidity of the acid mixture roughly corresponds to 96% $H_2SO_4$. Isobutane concentration in the hydrocarbon phase was about 30% by weight.

The results shown in Table III also show the improved yield of $C_8$ hydrocarbons in the light alkylate and the reduction in dimethyl-substituted isomers (and therefore the increase in trimethyl-substituted isomers.)

TABLE III

| Component | Yield, percent weight | |
|---|---|---|
| | 96% $H_2SO_4$ | $CF_3CO_2H$– $H_2SO_4$ |
| $C_5$ | 11.6 | 11.5 |
| $C_6$ | 11.2 | 10.5 |
| 2,4-Dimethylpentane | 6.1⎫ 10.9 | 5.2⎫ 9.8 |
| Other $C_7$ | 4.8⎭ | 4.6⎭ |
| Dimethylhexane | 11.0⎫ 41.1 | 8.9⎫ 54.0 |
| Trimethylpentanes | 30.1⎭ | 45.1⎭ |
| $C_9$ | 25.2 | 14.2 |
| | 100.0 | 100.0 |

Quality of the light alkylate produced by the process of the invention is improved considerably. This results not only from the higher proportion of $C_8$ hydrocarbons but also from the reduction in less branched isomers, particularly dimethylhexane and 2,4-dimethylpentane, shown in the examples. Dimethylhexane and 2,4-dimethylpentane are undesirable because of their especially low performance number (Army-Navy Performance Number, Supercharge Method, 4 cc. TEL/gal.) of about 60 and 80, respectively. The higher branched isomers have a much better performance number such as about 150 for 2,2,4-trimethylpentane, about 210 for 2,3,3- and 2,3,4-trimethylpentane and about 150 for 2,2,5-trimethylhexane.

We claim as our invention:

1. In a process for alkylating isoparaffins with olefins, the step of contacting said isoparaffins with said olefins, under alkylation conditions in the presence of an acid catalyst, said acid comprising a mixture of concentrated sulfuric acid and a tri-substituted acetic acid in which all the alkyl hydrogen atoms of the acetic acid have been substituted with the same halogen having an atomic weight of no more than 36.

2. The process according to claim 1 wherein the substituted acetic acid is trifluoroacetic acid.

3. In a process for alkylating isobutane with butylenes, the step of contacting said isobutane with said butylenes, under alkylation conditions in the presence of an acid catalyst, said acid comprising a mixture of concentrated sulfuric acid and trifluoroacetic acid.

References Cited in the file of this patent

UNITED STATES PATENTS

| 2,286,184 | Bradley et al. | June 16, 1942 |
| 2,376,508 | Sachanen et al. | May 22, 1945 |
| 2,410,108 | Sachanen et al. | Oct. 29, 1946 |